United States Patent
Obayashi

(10) Patent No.: US 7,633,247 B2
(45) Date of Patent: Dec. 15, 2009

(54) CONTROL APPARATUS FOR MOTOR GENERATOR OF HYBRID VEHICLE

(75) Inventor: Kazuyoshi Obayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 370 days.

(21) Appl. No.: 11/638,350

(22) Filed: Dec. 14, 2006

(65) Prior Publication Data

US 2007/0145924 A1    Jun. 28, 2007

(30) Foreign Application Priority Data

Dec. 27, 2005   (JP)  ............... 2005-375395

(51) Int. Cl.
*H02P 3/00*   (2006.01)
(52) U.S. Cl. .................. 318/139; 318/140; 318/141; 318/432
(58) Field of Classification Search .................. 318/60, 318/689, 757, 140, 141, 139, 432, 87, 149, 318/151, 153; 180/65.4, 65.31, 165, 2.1, 180/65.285; 322/7
See application file for complete search history.

(56) References Cited

U.S. PATENT DOCUMENTS

| | | | | |
|---|---|---|---|---|
| 5,722,911 | A * | 3/1998 | Ibaraki et al. ............... | 477/3 |
| 5,786,640 | A * | 7/1998 | Sakai et al. ................. | 290/17 |
| 5,789,881 | A * | 8/1998 | Egami et al. ................ | 318/139 |
| 6,020,697 | A * | 2/2000 | Shimasaki et al. .......... | 318/140 |
| 6,093,974 | A * | 7/2000 | Tabata et al. ............... | 290/40 R |
| 6,201,312 | B1 * | 3/2001 | Shioiri et al. .............. | 290/40 C |
| 6,232,733 | B1 * | 5/2001 | Obayashi et al. ............ | 318/432 |
| 6,314,347 | B1 * | 11/2001 | Kuroda et al. .............. | 701/22 |
| 6,335,610 | B1 * | 1/2002 | Winstead .................... | 320/132 |
| 6,359,404 | B1 * | 3/2002 | Sugiyama et al. ............ | 318/432 |
| 6,362,580 | B1 * | 3/2002 | Omata et al. ............... | 318/139 |
| 6,443,126 | B1 * | 9/2002 | Morimoto et al. ...... | 123/339.15 |
| 6,452,352 | B1 * | 9/2002 | Farkas ........................ | 318/433 |
| 6,892,125 | B2 * | 5/2005 | Sakamoto et al. ............ | 701/51 |
| 7,030,580 | B2 * | 4/2006 | Hoff ........................... | 318/141 |
| 2003/0102673 | A1 * | 6/2003 | Nada .......................... | 290/40 C |
| 2004/0074682 | A1 * | 4/2004 | Fussey et al. .............. | 180/65.2 |
| 2004/0079564 | A1 * | 4/2004 | Tabata ........................ | 180/65.2 |

(Continued)

FOREIGN PATENT DOCUMENTS

JP   B 3537810   3/2004

(Continued)

*Primary Examiner*—Bentsu Ro
*Assistant Examiner*—Anthony M Paul
(74) *Attorney, Agent, or Firm*—Oliff & Berridge, PLC

(57) ABSTRACT

According to the invention, there is provided a control apparatus for a motor generator of a hybrid vehicle. The control apparatus includes a determiner, a comparator, and a controller. The determiner works to determine values of a first and a second parameter, which are defined in the same unit and respectively representative of economic benefits obtainable by operating the motor generator in generator and motor modes. The comparator works to compare the determined values of the first and second parameters. The controller works to control the motor generator to operate in the generator mode when the value of the first parameter is greater than that of the second parameter and in the motor mode when the value of the second parameter is greater than that of the first parameter. With such a configuration, the control apparatus can economically shift operation of the motor generator between the generator and motor modes.

7 Claims, 10 Drawing Sheets

U.S. PATENT DOCUMENTS

| | | | |
|---|---|---|---|
| 2004/0104059 A1* | 6/2004 | Yamamoto et al. | 180/65.2 |
| 2004/0164616 A1 | 8/2004 | Obayashi et al. | |
| 2005/0082098 A1* | 4/2005 | Ito et al. | 180/65.2 |

FOREIGN PATENT DOCUMENTS

| | | |
|---|---|---|
| JP | 2004-249900 | 9/2004 |
| JP | 2004-260908 | 9/2004 |
| JP | A-2005-094865 | 4/2005 |
| JP | B 3662904 | 4/2005 |

* cited by examiner

CONTROL APPARATUS FOR MOTOR GENERATOR OF HYBRID VEHICLE

CROSS-REFERENCE TO RELATED APPLICATION

This application is based on and claims priority from Japanese Patent Application No. 2005-375395, filed on Dec. 27, 2005, the content of which is hereby incorporated by reference into this application.

BACKGROUND OF THE INVENTION

1. Technical Field of the Invention

The present invention relates generally to hybrid vehicles and motor generators. More particularly, the invention relates to a control apparatus for a motor generator of a hybrid vehicle, which can economically shift operation of the motor generator between motor and generator modes, thereby minimizing running cost of the hybrid vehicle.

2. Description of the Related Art

In recent years, hybrid vehicles have been developed for the purpose of improving fuel economy.

Hybrid vehicles generally include an internal combustion engine and an electric system that includes, at least, a motor generator and an electric energy storage device (e.g., a battery).

The motor generator is mechanically connected to the drive train of the vehicle and electrically connected to the electric storage device, so that it can selectively operate in either motor or generator mode.

Specifically, in the motor mode, the motor generator receives electric energy from the electric energy storage device to generate torque, thereby assisting the engine in driving the drive train or driving the drive train by itself; in the generator mode, the motor generator receives torque from the drive train to generate electric energy, thereby recharging the electric energy storage device or powering other electric loads.

In order to minimize running cost (e.g., fuel consumption) of the vehicle, it is required to economically control the motor generator, more specifically, to economically shift operation of the motor generator between the motor and generator modes.

Japanese Patent No. 3537810 (to be referred to as patent document 1 hereinafter) discloses a control method for a hybrid vehicle, according to which an optimal running mode of the vehicle is selected from an engine-driven mode, a motor generator-driven mode, and an engine-and-motor generator-driven mode based on the fuel consumption of the vehicle in each of those modes.

However, the above patent document 1 does not address the issue of how to economically shift operation of the motor generator between the motor and generator modes, though the issue is critical to the minimization of running cost of the vehicle.

Moreover, in the above patent document 1, the equivalent fuel consumption of the motor generator in the engine-and-motor generator-driven mode is determined on the assumption that the motor generator generates electric energy only when the engine runs at maximum efficiency and generates torque only with the electric energy generated thereby. In other words, the availability of electric energy generated by low-cost power generations, such as regenerative braking and cogeneration, is not considered in the determination of equivalent fuel consumption of the motor generator. Accordingly, it is impossible to accurately determine the equivalent fuel consumption of the motor generator. Consequently, chances of the motor generator working as a motor are reduced, thus making it difficult to minimize the running cost of the vehicle.

Japanese Patent No. 3662904 (to be referred to as patent document 2 hereinafter) discloses a drive control system for a hybrid vehicle.

The drive control system is configured to determine the ratio of driving force between the engine and the motor generator based on a comparison between a first and a second parameter. The first parameter is defined as the ratio of a decrease in fuel consumption of the engine to an amount of electric energy consumed by the motor generator; the second parameter is defined as the ratio of an amount of electric energy charged into the electric energy storage device (i.e., a battery in this case) to an increase in fuel consumption of the engine.

However, in the above patent document 2, the first and second parameters are defined in different units, more specifically, in units which are in inverse relation to each other. Therefore, it may be difficult to accurately determine the ratio of driving force between the engine and the motor generator based on the comparison between the first and second parameters.

SUMMARY OF THE INVENTION

The present invention has been made in view of the above-mentioned problems with the prior art.

According to a first aspect of the present invention, there is provided a control apparatus for a motor generator of a hybrid vehicle.

The motor generator is mechanically connected to a drive train of the vehicle and electrically connected to an electric energy source of the vehicle. The motor generator is configured to have a generator mode, in which the motor generator receives torque from the drive train to generate electric energy, and a motor mode in which the motor generator receives electric energy from the electric energy source to generate torque.

The control apparatus includes a determiner, a comparator, and a controller. The determiner works to determine values of a first and a second parameter. The first and second parameters are defined in the same unit and respectively representative of economic benefits obtainable by operating the motor generator in the generator and motor modes. The comparator works to compare the determined values of the first and second parameters. The controller works to control the motor generator to operate in the generator mode when the value of the first parameter is greater than that of the second parameter and in the motor mode when the value of the second parameter is greater than that of the first parameter.

With the above configuration, since the first and second parameters are defined in the same unit, it is possible to make a correct comparison between the economic benefits obtainable by operating the motor generator in the generator and motor modes. Consequently, it is possible to economically shift operation of the motor generator between the generator and motor modes, thereby minimizing running cost of the hybrid vehicle 1.

According to an embodiment of the invention, the first parameter is defined to be proportional to a difference between a first predetermined threshold and an increase in fuel consumption of the vehicle for operating the motor generator in the generator mode to generate unit electric energy, and the second parameter is defined to be proportional to a difference between a decrease in fuel consumption of the vehicle achievable by operating the motor generator in the motor mode with unit electric energy and a second predetermined threshold.

With the above definitions of the first and second parameters, it is possible to simply and accurately determine the economic benefits obtainable by operating the motor generator in the generator and motor modes.

Further, the electric energy source is an electric energy storage device. When State of Charge (SOC) of the electric energy storage device drops below a first reference level, the control apparatus modifies the first and second predetermined thresholds so as to increase the SOC, and when the SOC exceeds a second reference level that is higher than the first reference level, the control apparatus modifies the first and second predetermined thresholds so as to decrease the SOC.

With such modifications to the first and second predetermined thresholds, it is possible to economically shift operation of the motor generator between the generator and motor modes while keeping the SOC of the electric energy storage device within a desired range (i.e., between the first and second reference levels).

According to another embodiment of the invention, there is provided for the hybrid vehicle at least one electric energy supply device other than the motor generator, including the electric energy source, and wherein the first and second parameters are each defined as a function of a third parameter that is representative of electric energy supply cost of the electric energy supply device.

With the above configuration, it is possible to make a correct comparison between the electric energy supply costs of the motor generator and the electric energy supply device, thus opening the way for selection of the more economical one from them.

Further, the third parameter is an equivalent fuel consumption of the electric energy supplying device for supplying unit electric energy. The first parameter is defined as a product of an amount of electric energy generatable by the motor generator and a difference between the third parameter and an increase in fuel consumption of the vehicle for operating the motor generator in the generator mode to generate unit electric energy. The second parameter is defined as a product of an amount of electric energy consumable by the motor generator and a difference between a decrease in fuel consumption of the vehicle achievable by operating the motor generator in the motor mode with unit electric energy and the third parameter.

With the above definitions of the first and second parameters, it is also possible to simply and accurately determine the economic benefits obtainable by operating the motor generator in the generator and motor modes.

Furthermore, the determiner works to determine a first optimal amount of electric energy at which the first parameter has a maximum value, and a second optimal amount of electric energy at which the second parameter has a maximum value. The comparator works to compare the maximum values of the first and second parameters. The controller works to control the motor generator to generate the first optimal amount of electric energy when the maximum value of the first parameter is greater than that of the second parameter and to generate torque with the second optimal amount of electric energy when the maximum value of the second parameter is greater than that of the first parameter.

With this configuration, it is possible to maximize the economic benefits obtainable by operating the motor generator in the generator and motor modes.

In addition, the at least one electric energy supply device may include an external electric energy source provided outside the hybrid vehicle.

According to yet another embodiment of the invention, an internal electric energy source of the vehicle, which includes the motor generator and the electric energy source, is electrically connected to an external electric energy source that is provided outside the vehicle. The determiner also works to determine electric energy costs of the internal and external electric energy sources in the same unit. The comparator also works to compare the determined electric energy costs of the internal and external electric energy sources. The controller also works to control the internal electric energy source to receive electric energy from the external electric energy source when the electric energy cost of the internal electric energy source is higher than that of the external electric energy source and provide electric energy to the external electric energy source when the electric energy cost of the external electric energy source is higher than that of the internal electric energy source.

With the above configuration, it is possible to achieve energy savings in a wider extent beyond the vehicle.

According to a second aspect of the present invention, there is provided a computing device for a hybrid vehicle.

The hybrid vehicle includes an internal electric energy source that is electrically connected to an external electric energy source provided outside the vehicle.

The computing device includes an inputting unit, a computing unit, and an outputting unit. The inputting unit works to input information relating to electric energy costs of the internal and external electric energy sources. The computing unit works to compute the electric energy costs of the internal and external electric energy sources in the same unit based on the input information. The outputting unit works to output information indicative of the computed electric energy costs of the internal and external electric energy sources.

With the above configuration, since the electric energy costs of the internal and external electric energy sources are computed in the same unit, it is possible to make a correct comparison therebetween. Consequently, based on the information output from the computing device, one can accurately determine an economic direction of electric energy flow between the internal and external electric energy sources.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-7.

First Embodiment

Figure 1:
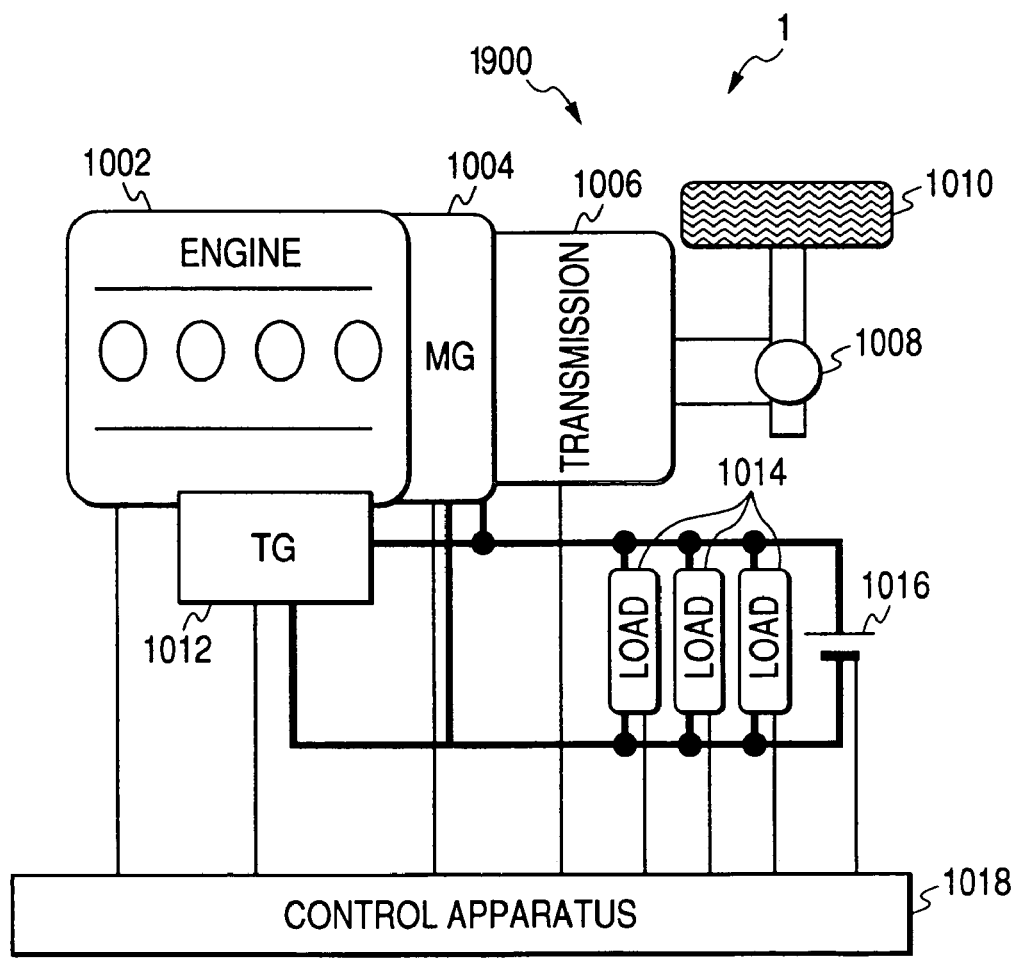
FIG. 1 is a schematic diagram illustrating the overall configuration of a hybrid vehicle according to the first embodiment of the invention.

FIG. 1 illustrates a hybrid vehicle 1 according to the first embodiment of the invention.

As shown in FIG. 1, the hybrid vehicle 1 includes an internal combustion engine 1002 as a prime source of driving force (i.e., torque). The engine 1002 is mechanically connected to wheels 1010 via a transmission 1006 and a differential gear 1008, so as to drive the wheels 1010.

The hybrid vehicle 1 also includes a Thermoelectric Generator (TG) 1012 that is configured to generate electric energy using waste heat from the engine 1002. The TG 1012 is electrically connected to electric loads 1014 and a battery 1016, so as to provide them with the generated electric energy.

The hybrid vehicle 1 further includes a Motor Generator (MG) 1004 that is mechanically connected to a drive train 1900 of the vehicle 1. More specifically, in the present embodiment, the MG 1004 is mechanically connected between the engine 1002 and the transmission 1004. Meanwhile, the MG 1004 is electrically connected to the electric loads 1014, the battery 1016, and the TG 1012.

With such a configuration, the MG 1004 can be selectively operated in either motor or generator mode. Specifically, in the motor mode, the MG 1004 receives electric energy from the battery 1016 to generate torque; the generated torque is then provided to the drive train 1900 of the vehicle 1. On the other hand, in the generator mode, the MG 1004 receives torque from the drive train of the vehicle 1 to generate electric energy; the generated electric energy is then provided to the electric loads 1014 and the battery 1016.

A control apparatus 1018 is further provided in the vehicle 1 to control operations of the engine 1002, the TG 1012, the MG 1004, the battery 1016, and the transmission 1006.

Specifically, the control apparatus 1018 receives sensing signals output from various sensors (not shown) of the vehicle 1. Then, based on the sensing signals, the control apparatus 1018 determines operating conditions of the devices 1002, 1012, 1004, and 1016, such as speed and fuel consumption of the engine 1002, input and output voltages of the MG 1004, State of Charge (SOC) of the battery 1016, and intention of the driver to, for example, accelerate or decelerate. After that, based on the determined operating conditions, the control apparatus 1018 performs various controls on the devices 1002, 1012, 1004, and 1016.

In addition, the hybrid vehicle 1 may include further or instead of the TG 1012 other electric energy generating devices, such as a solar battery.

Figure 2:
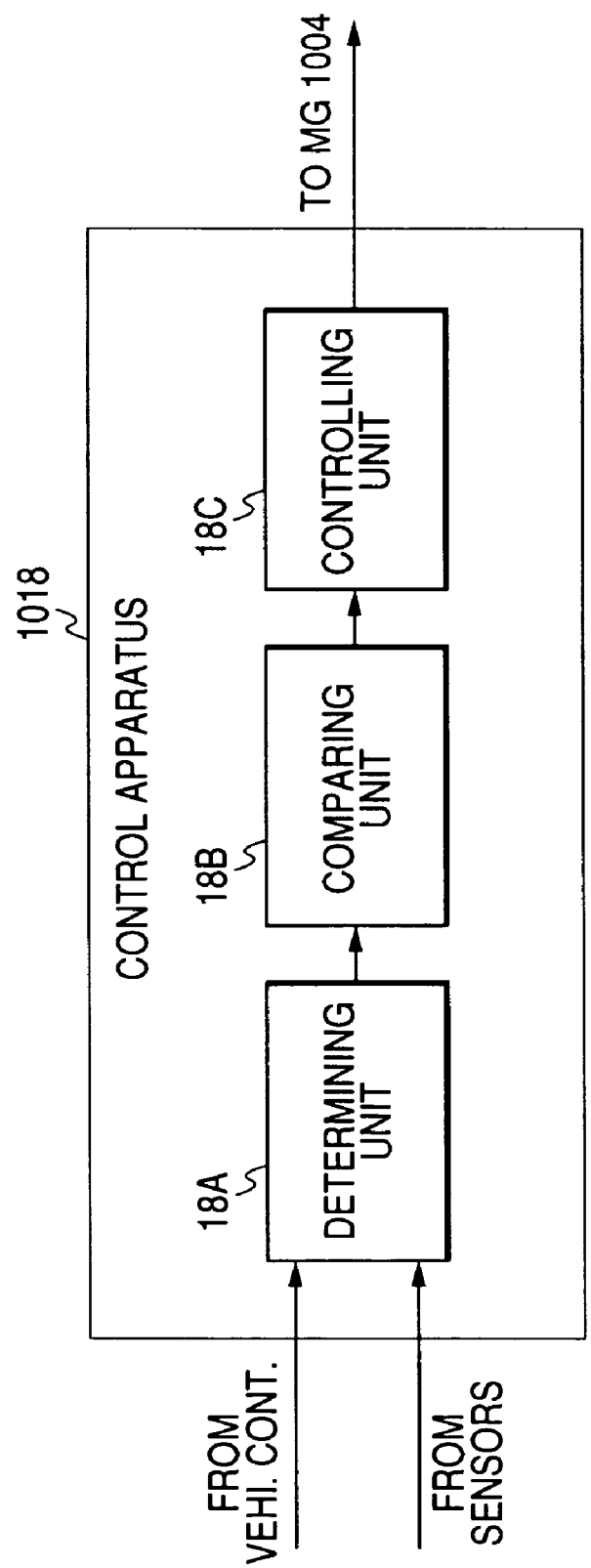
FIG. 2 is a functional block diagram showing the configuration of a control apparatus for a motor generator according to the first embodiment of the invention.

FIG. 2 shows an exemplary configuration of the control apparatus 1018 according to the present embodiment.

As shown in FIG. 2, in the present embodiment, the control apparatus 1018 functionally includes a determining unit 18a, a comparing unit 18b, and a controlling unit 18c.

Figure 3:
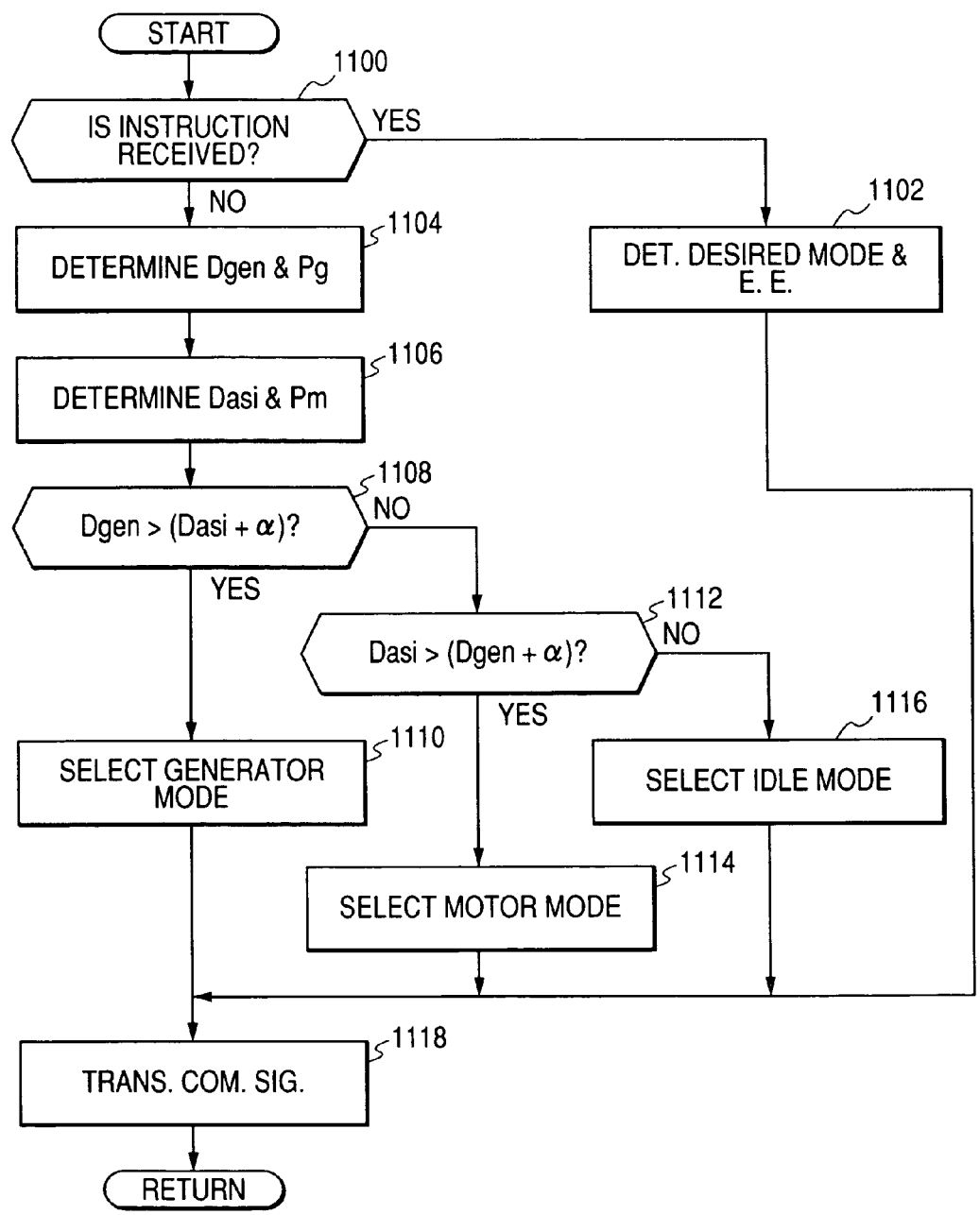
FIG. 3 is a flow chart illustrating a process of the control apparatus for controlling operation of the motor generator.

FIG. 3 shows a process of the control apparatus 1018 for controlling operation of the MG 1004.

When an ignition switch of the vehicle 1 is turned from off to on, the control apparatus 1018 is activated to perform resetting and initial settings. Then, the process proceeds to the step 1100.

At the step 1100, the determining unit 18A of the control apparatus 1018 determines whether an instruction on operation of the MG 1004 is received from a vehicle controller (not shown) of the vehicle 1.

If the determination at the step 1100 produces a "YES" answer, then the process proceeds to the step 1102; otherwise, the process goes on to the step 1104.

At the step 1102, the determining unit 18A determines, based on the received instruction, a desired operation mode of the MG 1004, which is either the motor mode or the generator mode, and a desired amount of electric energy to be generated (if the desired mode is the generator mode) or consumed (if the desired mode is the motor mode) by the MG 1004.

Then, at the succeeding step 1118, the controlling unit 18C of the control apparatus 1018 transmits to the MG 1004 a command signal indicative of the desired mode and the desired amount of electric energy, so that the MG 1004 can operate in accordance with the command signal.

In addition, the vehicle controller sends instructions to the control apparatus 1018 in various cases, for example, when it is required for the MG 1004 to drive the drive train 1900 of the vehicle 1 by itself, when it is required for the MG 1004 to generate torque to assist the engine 1002, or when it is required for the MG 1004 to generate electric energy to recharge the battery 1016. Alternatively, it is also possible to configure the control apparatus 1018 to create such instructions by itself based on the sensing from the sensors.

On the other hand, at the step 1104, the determining unit 18A determines values of parameters Dgen and Pg. Here, Dgen represents economic benefit obtainable by operating the MG 1004 in the generator mode to generate unit electric energy; Pg represents a desired amount of electric energy to be generated by the MG 1004 in the generator mode. The detailed definition and determination of Dgen will be described later.

At the succeeding step 1106, the determining unit 18A further determines values of parameters Dasi and Pm. Here, Dasi represents economic benefit obtainable by operating the MG 1004 in the motor mode with unit electric energy; Pm represents a desired amount of electric energy to be consumed by the MG 1004 in the motor mode. The detailed definition and determination of Dasi will be described later.

At the step 1108, the comparing unit 18B of the control apparatus 1018 compares the value of Dgen with the value of (Dasi+α), where α is a parameter having a predetermined positive value.

It should be emphasized that in the present embodiment, the parameters Dgen and Dasi are defined in the same unit, thus making correct comparison therebetween possible.

If the comparison at the step 1108 produces a result of the value of Dgen being greater than the value of (Dasi+α), then the process proceeds to the step 1110; otherwise, the process goes on to the step 1112.

At the step 1110, the controlling unit 18C selects the generator mode as the desired mode of the MG 1004. Then, at the succeeding step 1118, the controlling unit 18C transmits to the MG 1004 a command signal indicative of the generator mode and the value of Pg, thereby controlling the MG 1004 to operate in the generator mode to generate the amount Pg of electric energy.

On the other hand, at the step 1112, the comparing unit 18B further compares the value of Dasi with the value of (Dgen+$\alpha$).

If the comparison at the step 1112 produces a result of the value of Dasi being greater than the value of (Dgen+$\alpha$), then the process proceeds to the step 1114; otherwise, the process goes on to the step 1106.

At the step 1114, the controlling unit 18C selects the motor mode as the desired mode of the MG 1004. Then, at the succeeding step 1118, the controlling unit 18C transmits to the MG 1004 a command signal indicative of the motor mode and the value of Pm, thereby controlling the MG 1004 to operate in the motor mode with the amount Pm of electric energy.

On the other hand, at the step 1116, the controlling unit 18C selects idle mode as the desired mode of the MG 1004. This is because in this case, operating the MG 1004 in either the generator or motor mode produces no substantial economic benefit. At the succeeding step 1118, the controlling unit 18C transmits to the MG 1004 a command signal indicative of the idle mode, thereby controlling the MG 1004 to run idle.

In addition, in the above comparisons, the parameter $\alpha$ is used to stabilize the control. It is also possible to change the value of $\alpha$ according to, for example, condition of the battery 1016. Specifically, when the SOC of the battery 1016 drops below a first reference level, $\alpha$ may be modified to have a negative value, so as to increase chances of the MG 1004 operating in the generator mode to increase the SOC. On the contrary, when the SOC of the battery 1016 exceeds a second reference level that is higher than the first reference level, $\alpha$ may be modified to have a larger positive value, so as to increase chances of the MG 1004 operating in the motor mode to decrease the SOC.

Figure 4:
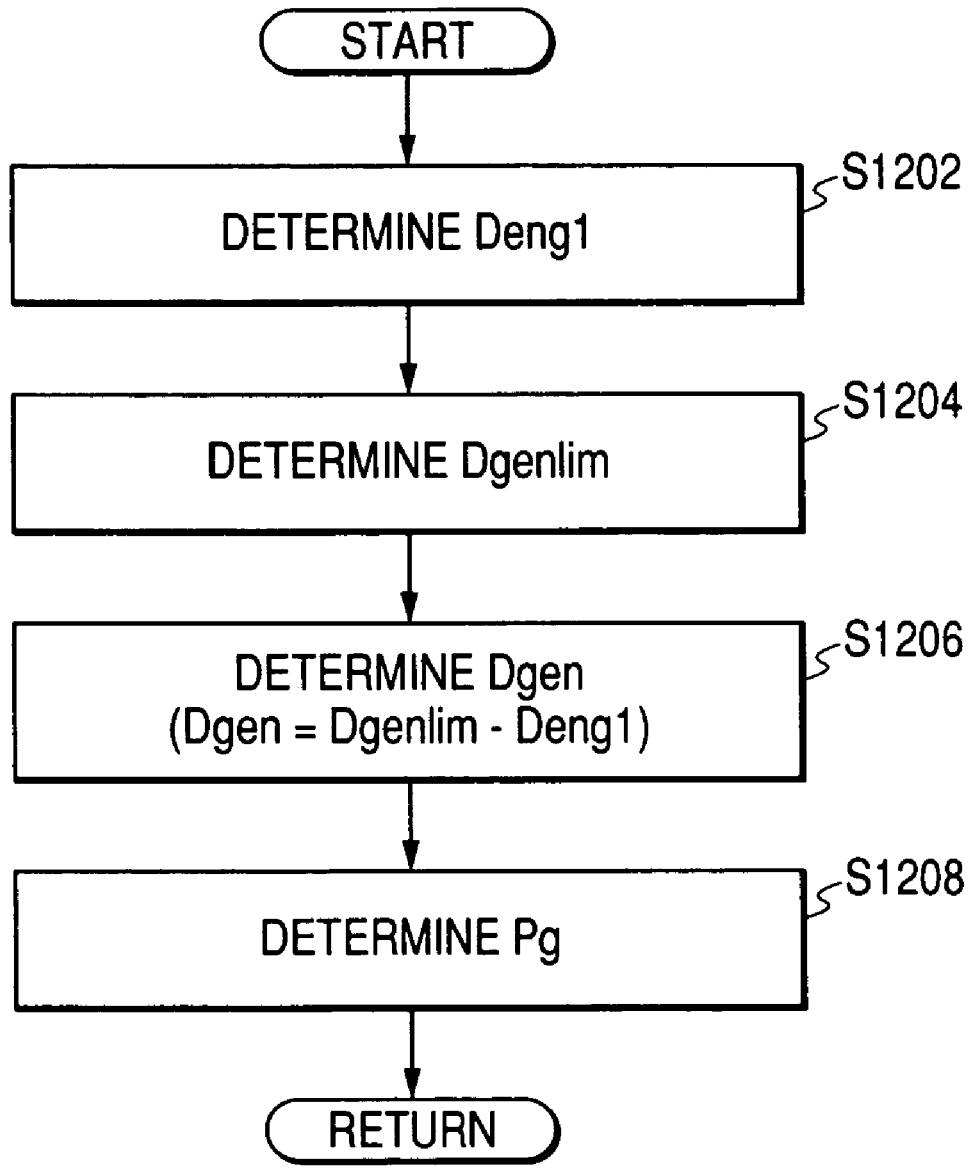
FIG. 4 is a flow chart illustrating a process of the control apparatus for determining parameters Dgen and Pg according to the first embodiment of the invention.

FIG. 4 shows a process of the control apparatus 1018 for determining the parameters Dgen and Pg; this process as a whole corresponds to the step 1104 of the process shown in FIG. 3.

First, at the step S1202, the determining unit 18A of the control apparatus 1018 determines the value of a parameter Deng1. Here, Deng1 represents an increase in fuel consumption of the engine 1002 for operating the MG 1004 in the generator mode at the present stage to generate unit electric energy. The method of determining the value of Deng1 is disclosed in Japanese Patent First Publication No. 2004-260908; thus the detailed description thereof is omitted here.

At the step S1204, the determining unit 18A further determines the value of a threshold Dgenlim. Here, Dgenlim represents an upper limit of increase in fuel consumption of the engine 1002 for operating the MG 1004 in the generator mode to generate unit electric energy. In other words, when the determined value of Deng1 is greater than that of Dgenlim, the MG 1004 is never permitted to operate in the generator mode.

In the present embodiment, Dgenlim is set to a constant value. However, it is also possible to change the value of Dgenlim according to, for example, condition of the battery 1016. Specifically, when the SOC of the battery 1016 drops below the first reference level, Dgenlim may be modified to have a higher value, so as to increase chances of the MG 1004 operating in the generator mode to increase the SOC.

At the step S1206, the determining unit 18A determines the value of Dgen as the result of subtracting the value of Deng1 from the value of Dgenlim (i.e., Dgen=Dgenlim−Deng1).

With the above relationship, the value of Dgen increases with decrease in the value of Degn1. In other words, when the increase in fuel consumption of the engine 1002 for operating the MG 1004 in the generator mode to generate unit electric energy is small, the economic benefit obtainable by operating the MG 1004 in the generator mode to generate unit electric energy is large.

At the succeeding step S1208, the determining unit 18A further determines, to the extent that the above-determined value of Dgen is positive, the value of a parameter Pgmax and employs the determined value of Pgmax as the value of Pg. Here, Pgmax represents the maximum amount of electric energy generatable by the MG 1004 at the present stage.

More specifically, in the present embodiment, the MG 1004 is configured to supply electric energy to both the battery 1016 and an electric subsystem that includes the electric loads 1014 and the TG 1012. Accordingly, the value of Pgmax can be determined as the sum of the value of a parameter Pch, which represents the allowable limit of electric energy to be charged into the battery 1016 at the present stage, and the value of a parameter Pc that represents the amount of electric energy required by the electric subsystem at the present stage. Further, the value of Pch can be determined according to condition of the battery 1016. For example, when the SOC of the battery 1016 exceeds the second reference level, Pch is given the value of zero. On the other hand, the value of Pc can be determined by subtracting the amount of electric energy generatable by the TG 1012 at the present stage from the amount of electric energy required by the electric loads 1014 at the present stage. In addition, there are several constraints on determination of the value of Pgmax, such as the power output capacity of the MG 1004 and the upper limit of a bus voltage of the electric system. The relationship between Pgmax and the upper limit of the bus voltage is disclosed in Japanese Patent First publication No. 2004-249900; thus the detailed description thereof is omitted here.

Figure 5:
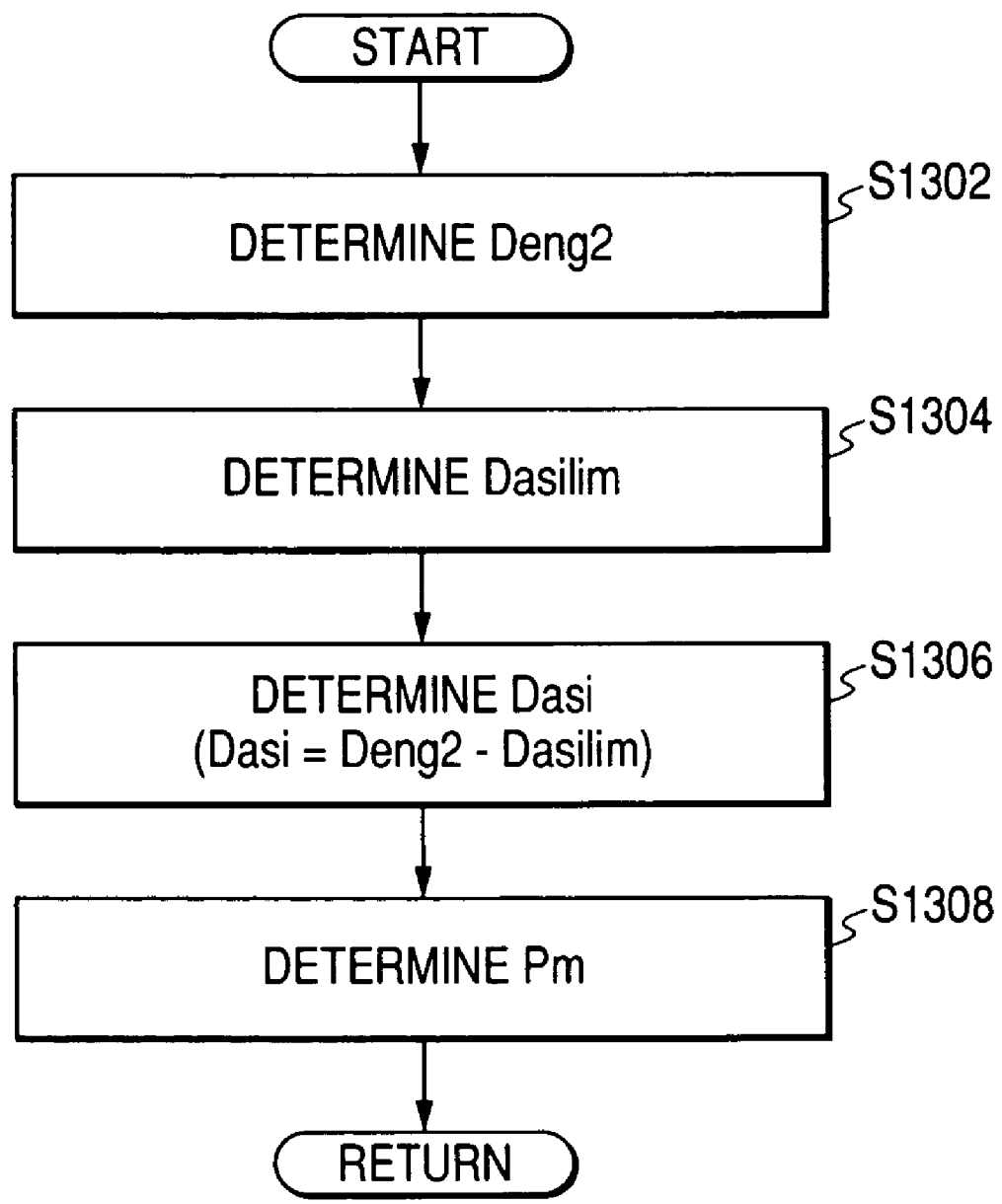
FIG. 5 is a flow chart illustrating a process of the control apparatus for determining parameters Dasi and Pm according to the first embodiment of the invention.

FIG. 5 shows a process of the control apparatus 1018 for determining the parameters Dasi and Pm; this process as a whole corresponds to the step 1106 of the process shown in FIG. 3.

First, at the step S1302, the determining unit 18A of the control apparatus 1018 determines the value of a parameter Deng2. Here, Deng2 represents a decrease in fuel consumption of the engine 1002 achievable by operating the MG 1004 in the motor mode at the present stage with unit electric energy.

It is apparent from the above definitions of Deng1 and Deng2 that the units of Deng1 and Deng2 are the same as each other. The value of Deng2 can be determined in the same way as that of Deng1; thus the detailed determination of the value of Deng2 is omitted here.

At the step S1304, the determining unit 18A further determines the value of a threshold Dasilim. Here, Dasilim represents a lower limit of decrease in fuel consumption of the engine 1002 achievable by operating the MG 1004 in the motor mode with unit electric energy. In other words, when the determined value of Deng2 is less than that of Dasilim, the MG 1004 is never permitted to operate in the motor mode.

In the present embodiment, Dasilim is set to a constant value. However, it is also possible to change the value of Dasilim according to, for example, condition of the battery 1016. Specifically, when the SOC of the battery 1016 exceeds the second reference level, Dasilim may be modified to have a lower value, so as to increase chances of the MG 1004 operating in the motor mode to decrease the SOC.

At the step S1306, the determining unit 18A determines the value of Dasi as the result of subtracting the value of Dasilim from the value of Deng2 (i.e., Dasi=Deng2−Dasilim).

With the above relationship, the value of Dasi increases with the value of Deng2. In other words, when the decrease in fuel consumption of the engine 1002 achievable by operating the MG 1004 in the motor mode with unit electric energy is large, the economic benefit obtainable by operating the MG 1004 in the generator mode with unit electric energy is accordingly large. Further, it should be emphasized again that in the present embodiment, the units of Dgen and Dasi are the same as each other.

At the succeeding step S1308, the determining unit 18A further determines, to the extent that the above-determined value of Dasi is positive, the value of a parameter Pmmax and employs the determined value of Pmmax as the value of Pm. Here, Pmmax represents the maximum amount of electric energy consumable by the MG 1004 at the present stage.

More specifically, in the present embodiment, the battery 1016 is configured to supply electric energy to both the MG 1004 and the electric subsystem that includes the electric loads 1014 and the TG 1012. Accordingly, the value of Pmmax can be determined by subtracting the value of Pc from the value of a parameter Pdi that represents the allowable limit of electric energy to be discharged from the battery 1016 at the present stage. As described previously, the value of Pc can be determined by subtracting the amount of electric energy generatable by the TG 1012 at the present stage from the amount of electric energy required by the electric loads 1014 at the present stage. On the other hand, the value of Pdi can be determined according to condition of the battery 1016. For example, when the SOC of the battery 1016 drops below the first reference level, Pdi is given the value of zero. In addition, there are several constraints on determination of the value of Pmmax, such as the power input capacity of the MG 1004 and the lower limit of the bus voltage of the electric system. The relationship between Pmmax and the lower limit of the bus voltage is also disclosed in Japanese Patent First publication No. 2004-249900; thus the detailed description thereof is omitted here.

As described above, in the present embodiment, Dgen and Dasi are defined in the same unit to respectively represent economic benefits obtainable by operating the MG 1004 in the generator and motor modes. Consequently, it is possible to make a correct comparison between the economic benefits, thereby economically shifting operation of the MG 1004 between the generator and motor modes to minimize running cost of the hybrid vehicle 1.

Second Embodiment

This embodiment illustrates parameters Fgen and Fasi which can be used, instead of Dgen and Dasi, to respectively represent economic benefits obtainable by operating the MG 1004 in the generator and motor modes.

Figure 6:
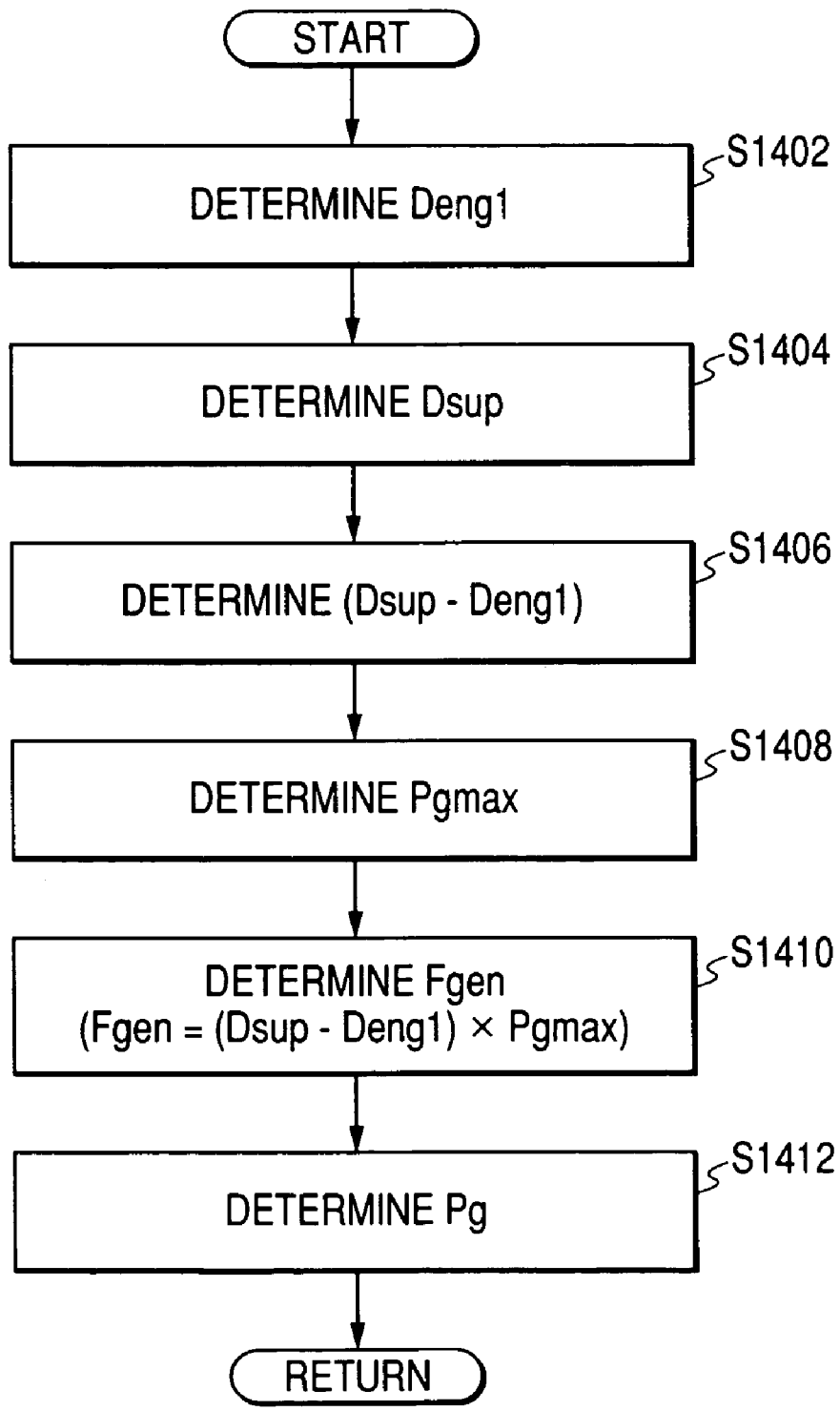
FIG. 6 is a flow chart illustrating a process of the control apparatus for determining parameters Fgen and Pg according to the second embodiment of the invention.

FIG. 6 shows determination of the parameters Fgen and Pg by the determining unit 18A of the control apparatus 1018.

First, at the step S1402, the determining unit 18A determines the value of Deng1. Here, Deng1 has the same definition and can be determined in the same way as in the previous embodiment.

At the step S1404, the determining unit 18A further determines the value of a threshold Dsup. Here, Dsup represents the equivalent fuel consumption (i.e., cost) of at least one electric energy supply device other than the MG 1004 for supplying unit electric energy.

In the present embodiment, when the at least one electric energy supply device other than the MG 1004 includes only the battery 1016, Dsup can be determined as the cost Dbat for charging unit electric energy into the battery 1016 in terms of fuel consumption. Otherwise, when the at least one electric energy supply device other than the MG 1004 includes only the TG 1012, Dsup can be determined as the cost Dtg for generating unit electric energy by the TG 1012 in terms of fuel consumption; Dtg is usually equal to zero. Still otherwise, when the at least one electric energy supply device other than the MG 1004 includes both the battery 1016 and the TG 1012, Dsup can be determined as a function of Dbat and Dtg. For example, Dsup can be determined as a weighted average of Dbat and Dtg according to the amounts of electric energy supplied by the battery 1016 and the TG 1012; or Dsup can be determined as the minimum value between Dbat and Dtg. In addition, if the hybrid vehicle 1 further includes a dedicated automotive alternator, the at least one electric energy supply device would also include the automotive alternator.

At the step 1406, the determining unit 18A determines the value of (Dsup−Deng1), which represents economic benefit obtainable by operating the MG 1004 in the generator mode at the present stage to generate unit electric energy in substitution for the at least one other electric energy supply device.

At the succeeding step 1408, the determining unit 18A further determines the value of Pgmax to the extent that the above-determined value of (Dsup−Deng1) is positive. In the present embodiment, the value of Pgmax can be determined as the sum of the value of Pch, which represents the allowable limit of electric energy to be charged into the battery 1016 at the present stage, and the amount of electric energy required by the electric loads 1014 at the present stage.

At the step S1410, the determining unit 18A determines the value of Fgen which is defined as the product of (Dsup−Deng1) and Pgmax (i.e., Fgen=(Dsup−Deng1)×Pgmax).

It is apparent from the above definition that Fgen represents economic benefit obtainable by operating the MG 1004 in the generator mode at the present stage to generate the amount Pgmax of electric energy in substitution for the at least one other electric energy supply device.

At the last step S1412, the determining unit 18A determines the value of Pg; specifically, it employs the above-determined value of Pgmax as the value of Pg.

Figure 7:
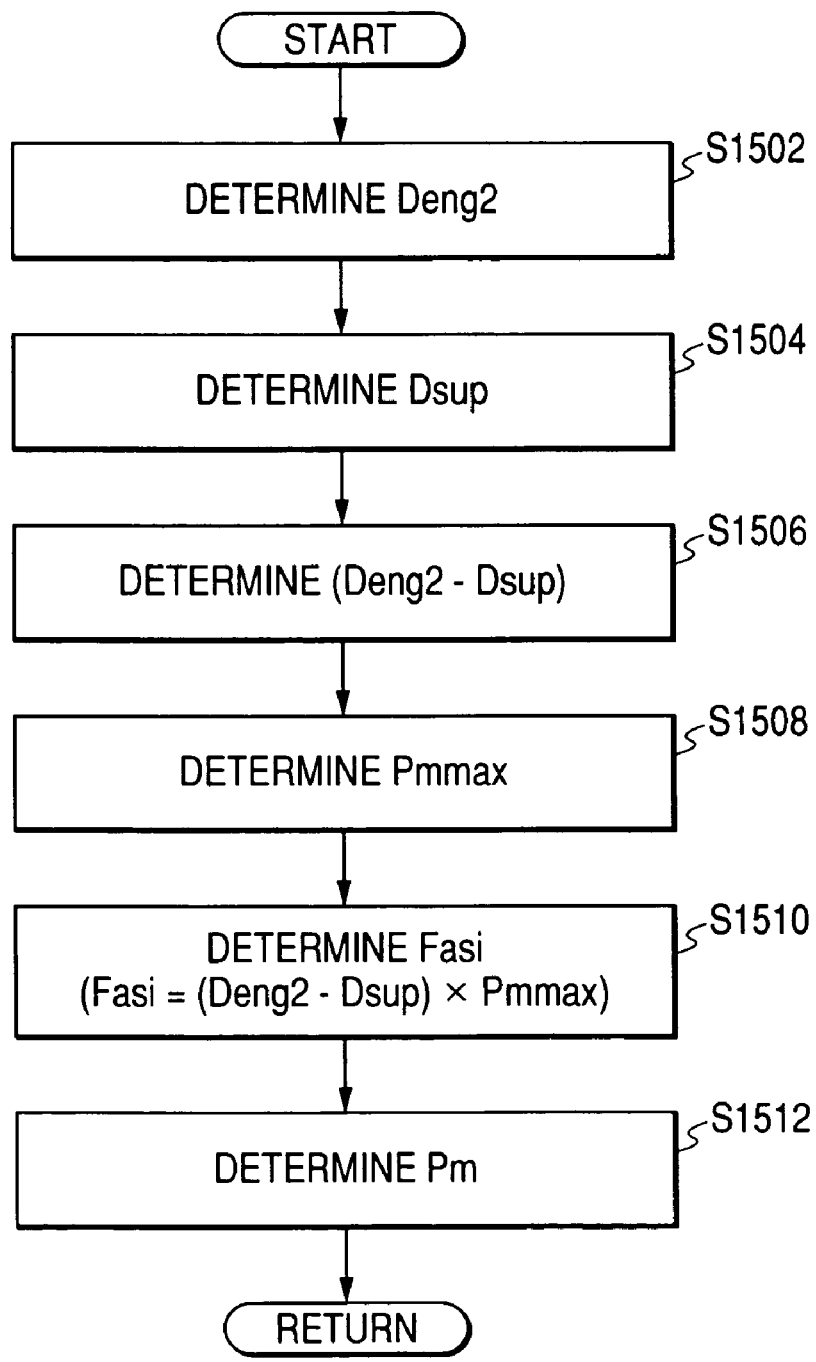
FIG. 7 is a flow chart illustrating a process of the control apparatus for determining parameters Fasi and Pm according to the second embodiment of the invention.

FIG. 7 shows determination of the parameters Fasi and Pm by the determining unit 18A of the control apparatus 1018.

First, at the step S1502, the determining unit 18A determines the value of Deng2. Here, Deng2 has the same definition and can be determined in the same way as in the previous embodiment.

At the step S1504, the determining unit 18A further determines the value of Dsup. Here, Dsup has the same definition and can be determined in the same way as in the process of FIG. 6.

At the step 1506, the determining unit 18A determines the value of (Deng2−Dsup), which represents economic benefit obtainable by operating the MG 1004 in the motor mode at the present stage with unit electric energy supplied by the at least one other electric energy supply device.

At the succeeding step 1508, the determining unit 18A further determines the value of Pmmax to the extent that the above-determined value of (Deng2−Dsup) is positive. Here, Pmmax has the same definition and can be determined in the same way as in the previous embodiment.

At the step S1510, the determining unit 18A determines the value of Fasi which is defined as the product of (Deng2−Dsup) and Pmmax (i.e., Fasi=(Deng2−Dsup)×Pmmax).

It is apparent from the above definition that Fasi represents economic benefit obtainable by operating the MG 1004 in the motor mode at the present stage with the amount Pmmax of electric energy supplied by the at least one other electric energy supply device. Further, it should be emphasized that in the present embodiment, the units of Fgen and Fasi are the same as each other.

At the last step S1512, the determining unit 18A determines the value of Pm; specifically, it employs the above-determined value of Pmmax as the value of Pm.

As described above, in the present embodiment, Fgen and Fasi are defined in the same unit to respectively represent economic benefits obtainable by operating the MG 1004 in the generator and motor modes. Consequently, it is possible to make a correct comparison between the economic benefits, thereby economically shifting operation of the MG 1004 between the generator and motor modes to minimize running cost of the hybrid vehicle 1.

Further, in the present embodiment, Fgen and Fasi respectively represent the total amounts of fuel saving (not the amounts of fuel saving per unit electric energy as represented by Dgen and Dasi in the previous embodiment) achievable by operating the MG 1004 in the generator and motor modes. Therefore, it is possible to make a correct comparison between the total economic benefits obtainable by operating the MG 1004 in the generator and motor modes.

Furthermore, in the present embodiment, Dsup is defined in the same unit as Deng1 and Deng2. Consequently, it is possible to make a correct comparison between the electric energy supply costs of different electric energy supply devices, thus opening the way for selection of the more economical device.

Other Embodiment

While the above particular embodiments of the invention have been shown and described, it will be understood by those who practice the invention and those skilled in the art that various modifications, changes, and improvements may be made to the invention without departing from the spirit of the disclosed concept.

For example, in the first embodiment, Deng1 is defined to represent an increase in fuel consumption of the engine 1002 for operating the MG 1004 in the generator mode at the present stage to generate unit electric energy.

As an alternative to the above definition, Deng1 may be defined to represent an increase in fuel consumption of the engine 1002 for operating the MG 1004 in the generator mode at a maximum output condition to generate unit electric energy; the maximum output condition is a condition at which the MG 1004 generates the maximum amount Pg of electric energy.

Similarly, in the first embodiment, Deng2 is defined to represent a decrease in fuel consumption of the engine 1002 achievable by operating the MG 1004 in the motor mode at the present stage with unit electric energy.

As an alternative to the above definition, Deng2 may be defined to represent a decrease in fuel consumption of the engine 1002 achievable by operating the MG 1004 in the motor mode at a maximum input condition with unit electric energy; the maximum input condition is a condition at which the MG 1004 consumes the maximum amount Pm of electric energy.

In the second embodiment, Fgen and Fasi are respectively defined as (Dsup−Deng1)×Pgmax and (Deng2−Dsup)×Pmmax, where Pgmax and Pmmax respectively represent the maximum amounts of electric energy generatable and consumable by the MG 1004 at the present stage.

As an alternative to the above definitions, Fgen and Fasi may be respectively defined as (Dsup−Deng1)×Pgopt and (Deng2−Dsup)×Pmopt. Here, Pgopt and Pmopt respectively represent the optimal amounts of electric energy generatable and consumable by the MG 1004 at the present stage; Fgen and Fasi have the maximum values respectively at the Pgopt and Pmopt.

Figure 8:
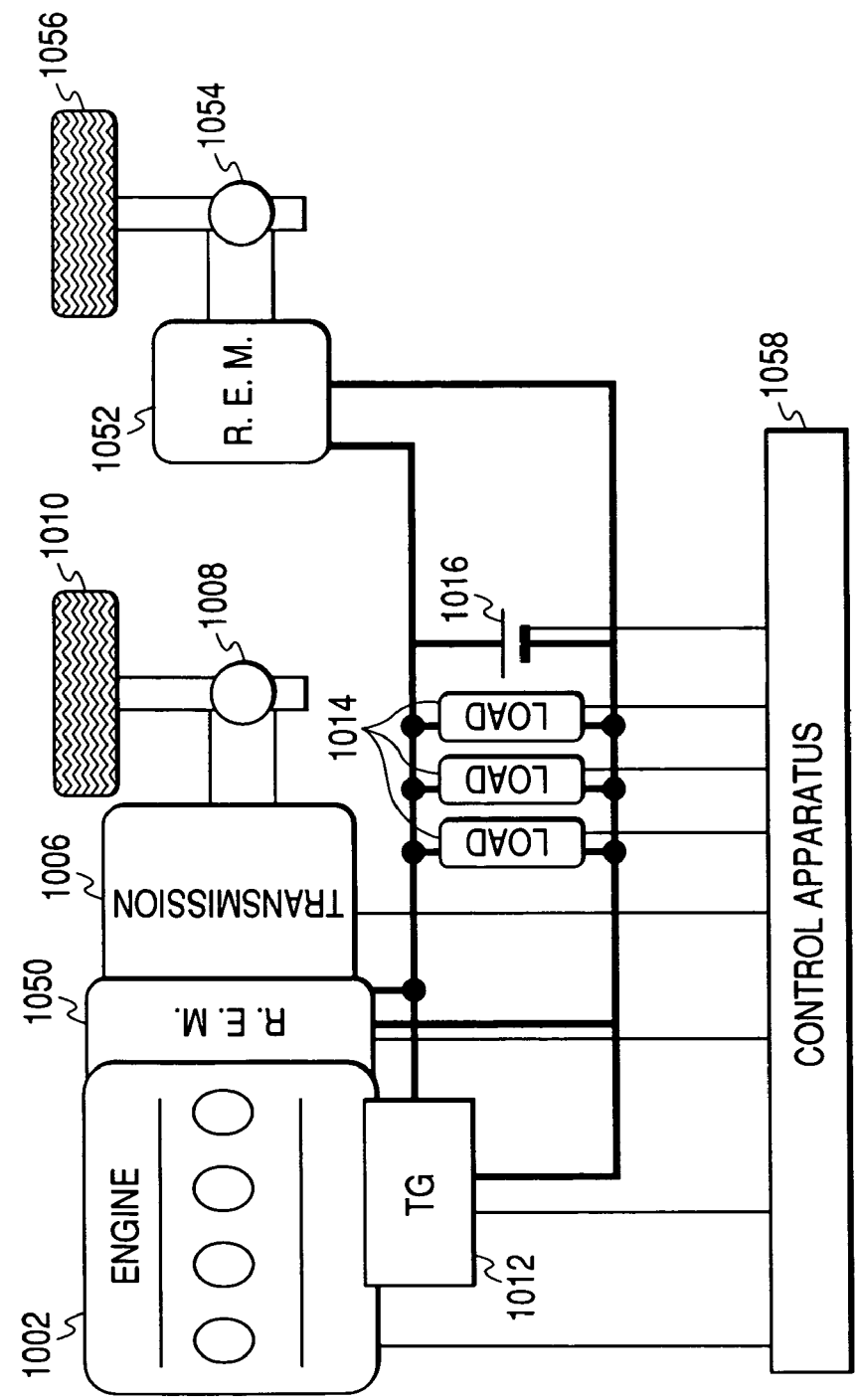
FIG. 8 is a schematic diagram illustrating a modified configuration of the hybrid vehicle.

FIG. 8 illustrates a modification of the configuration of the hybrid vehicle 1.

As shown in FIG. 8, in the modified configuration, there are provided a first rotary electric machine 1050 and a second rotary electric machine 1052, both of which operate under control of a control apparatus 1058. The second rotary electric machine 1052 is mechanically connected, via a differential gear 1054, to wheels 1056 to drive them.

When the first rotary electric machine 1050 is configured with an automotive alternator and the second rotary electric machine 1052 is configured with a motor generator, the control apparatus 1058 works to economically shift operation of the second rotary electric machine 1052 between generator and motor modes to minimize running cost of the hybrid vehicle 1. Otherwise, when the first rotary electric machine 1050 is configured with a motor generator and the second rotary electric machine 1052 is configured with a motor or a motor generator, the first and second rotary electric machines 1050 and 1052 can be considered as an integrated motor generator 1004 and the control apparatus 1058 works to economically shift operation of the integrated motor generator 1004 between generator and motor modes to minimize running cost of the hybrid vehicle 1.

Figure 9:
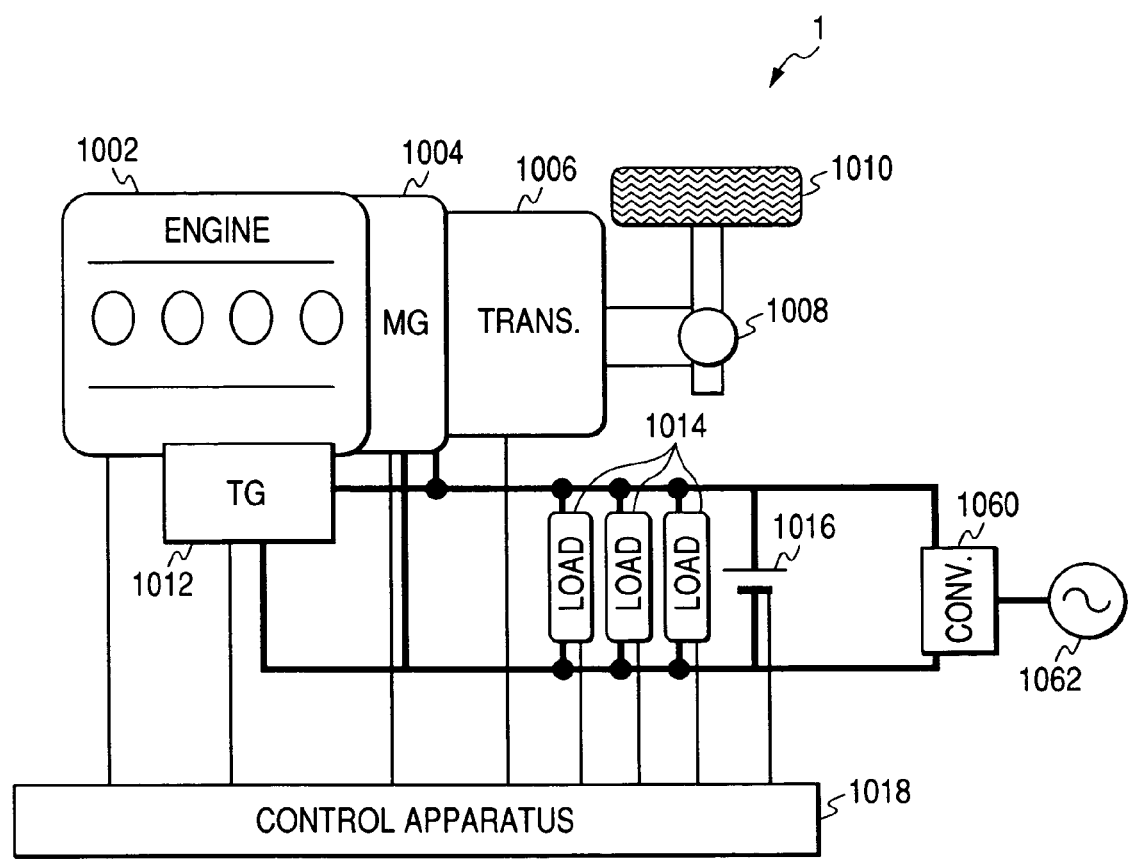
FIG. 9 is a schematic diagram illustrating another modified configuration of the hybrid vehicle.

FIG. 9 illustrates another modification of the configuration of the hybrid vehicle 1.

As shown in FIG. 9, in this modified configuration, the battery 1016 is electrically connected to an external electric energy source 1062 via a converter 1060, so as to selectively receive and provide electric energy from and to the external source 1062. The external source 1062 may be a commercial power source available at a parking space.

Figure 10:
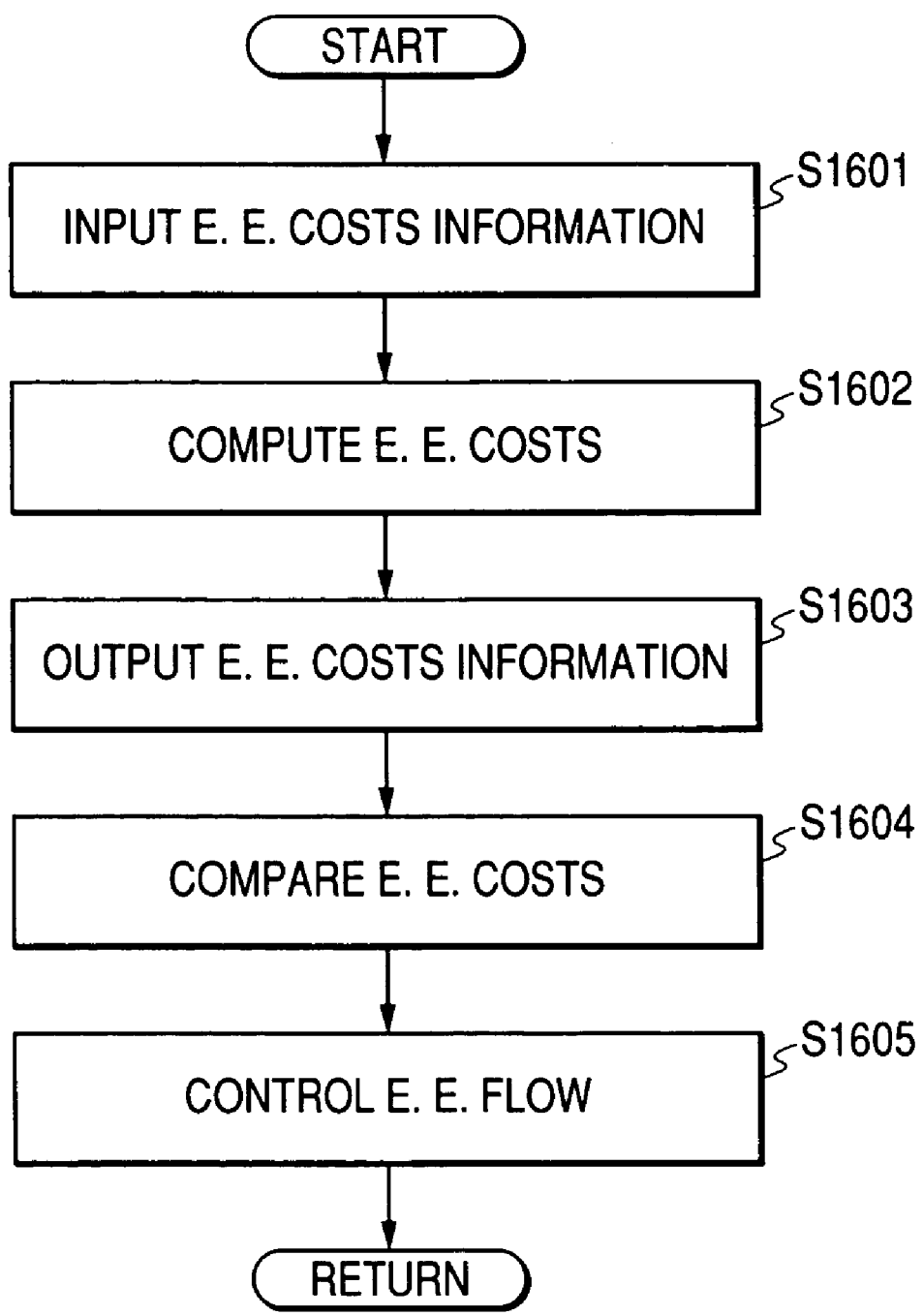
FIG. 10 is a flow chart illustrating a process of the control apparatus in FIG. 9 for determining a direction of electric energy flow between the hybrid vehicle and an external electric energy source.

In this case, the control apparatus 1018 may be configured to further functionally include an inputting unit and an outputting unit to input and output information about electric energy costs of the internal sources and the external source 1062; the internal sources include the battery 1016, the MG 1004, and the TG 1012. Moreover, the control apparatus 1018 may be configured to further perform a process as shown in FIG. 10.

Specifically, at the step 1601 of the process, the inputting unit of the control apparatus 1018 inputs information relating to the electric energy costs of the internal and external electric energy sources.

At the step S1602, based on the input information, the determining unit 18A computes the electric energy costs of the internal and external sources in terms of fuel consumption. For example, if the electricity rate of the external source 1062 is 10 JPY/kwh and the fuel rate is 100 JPY/kg, then the equivalent fuel consumption (i.e., the electric energy cost in terms of fuel consumption) of the external source 1062 is equal to 0.1 kg/kwh.

At the step S1603, the outputting unit of the control apparatus 1018 outputs information indicative of the computed electric energy costs of the internal and external sources to an external device or circuit. At the same time, the information is provided to the comparing unit 18B of the control apparatus 1018.

At the step S1604, the comparing unit 18B compares the electric energy cost of the external cost of the external source 1062 with those of the internal sources.

At the step S1605, the controlling unit 18C of the control apparatus 1018 controls the battery 1016 to receive electric energy from the external source 1062 when the electric energy costs of the internal sources are higher than that of the external source 1062 and controls the internal sources to provide electric energy to the external source 1062 when the electric energy cost of the external source 1062 is higher than those of the internal sources.

Consequently, with the above modified configuration, it is possible to achieve energy savings in a wider extent beyond the hybrid vehicle 1.

Such modifications, changes, and improvements within the skill of the art are intended to be covered by the appended claims.

What is claimed is:

1. A control apparatus for a motor generator of a hybrid vehicle, wherein the motor generator is mechanically connected to a drive train of the vehicle and electrically connected to an electric energy source of the vehicle, and wherein the motor generator is configured to have a generator mode, in which the motor generator receives torque from the drive train to generate electric energy, and a motor mode in which the motor generator receives electric energy from the electric energy source to generate torque, the control apparatus comprising:

a determiner working to determine values of a first and a second parameter, the first and second parameters being defined in the same unit and respectively representative of economic benefits obtainable by operating the motor generator in the generator and motor modes;

a comparator working to compare the determined values of the first and second parameters; and a controller working to control the motor generator to operate in the generator mode when the value of the first parameter is greater than that of the second parameter and in the motor mode when the value of the second parameter is greater than that of the first parameter, wherein the first parameter is defined to be proportional to a difference between a first predetermined threshold and an increase in fuel consumption of the vehicle for operating the motor generator in the generator mode to generate unit electric energy, and the second parameter is defined to be proportional to a difference between a decrease in fuel consumption of the vehicle achievable by operating the motor generator in the motor mode with unit electric energy and a second predetermined threshold.

2. The control apparatus as set forth in claim 1, wherein the electric energy source is an electric energy storage device, and wherein when State of Charge (SOC) of the electric energy storage device drops below a first reference level, the control apparatus modifies the first and second predetermined thresholds so as to increase the SOC, and when the SOC exceeds a second reference level that is higher than the first reference level, the control apparatus modifies the first and second predetermined thresholds so as to decrease the SOC.

3. The control apparatus as set forth in claim 1, wherein there is provided for the hybrid vehicle at least one electric energy supply device other than the motor generator, including the electric energy source, and wherein the first and second parameters are each defined as a function of a third parameter that is representative of electric energy supply cost of the electric energy supply device.

4. The control apparatus as set forth in claim 3, wherein the third parameter is an equivalent fuel consumption of the electric energy supplying device for supplying unit electric energy, the first parameter is defined as a product of an amount of electric energy generatable by the motor generator and a difference between the third parameter and an increase in fuel consumption of the vehicle for operating the motor generator in the generator mode to generate unit electric energy, and the second parameter is defined as a product of an amount of electric energy consumable by the motor generator and a difference between a decrease in fuel consumption of the vehicle achievable by operating the motor generator in the motor mode with unit electric energy and the third parameter.

5. The control apparatus as set forth in claim 4, wherein the determiner works to determine a first optimal amount of electric energy at which the first parameter has a maximum value, and a second optimal amount of electric energy at which the second parameter has a maximum value, the comparator works to compare the maximum values of the first and second parameters, and the controller works to control the motor generator to generate the first optimal amount of electric energy when the maximum value of the first parameter is greater than that of the second parameter and to generate torque with the second optimal amount of electric energy when the maximum value of the second parameter is greater than that of the first parameter.

6. The control apparatus as set forth in claim 3, wherein the at least one electric energy supply device includes an external electric energy source provided outside the hybrid vehicle.

7. The control apparatus as set forth in claim 1, wherein an internal electric energy source of the vehicle, which includes the motor generator and the electric energy source, is electrically connected to an external electric energy source that is provided outside the vehicle, and wherein the determiner also works to determine electric energy costs of the internal and external electric energy sources in the same unit, the comparator also works to compare the determined electric energy costs of the internal and external electric energy sources, and the controller also works to control the internal electric energy source to receive electric energy from the external electric energy source when the electric energy cost of the internal electric energy source is higher than that of the external electric energy source and provide electric energy to the external electric energy source when the electric energy cost of the external electric energy source is higher than that of the internal electric energy source.

* * * * *